Patented Dec. 19, 1922.

1,439,512

UNITED STATES PATENT OFFICE.

GEORGES HEBERLEIN, OF WATTWIL, SWITZERLAND, ASSIGNOR TO HEBERLEIN PATENT CORPORATION, OF NEW YORK, N. Y., A CORPORATION OF NEW YORK.

PROCESS FOR PRODUCTION OF PERMANENT EFFECTS IN COTTON FABRICS.

No Drawing. Application filed September 1, 1921. Serial No. 497,737.

(GRANTED UNDER THE PROVISIONS OF THE ACT OF MARCH 3, 1921, 41 STAT. L., 1313.)

*To all whom it may concern:*

Be it known that I, GEORGES HEBERLEIN, a citizen of the Swiss Republic, and a resident of Wattwil, Canton of St. Gall, Switzerland, have invented certain new and useful Improvements in Processes for Production of Permanent Effects in Cotton Fabrics, (which improvements are described in the following filed applications, i. e., German application Ser. No. H.64376, filed Nov. 20, 1913; Patent #280,134, granted Nov. 4, 1914; French application Ser. No. 67013, filed Feb. 19, 1914; Patent #468,642, granted Apr. 29, 1914; British application Ser. No. 13129 of 1914, filed May 28, 1914; Patent #13129, granted as of Nov. 20, 1913; Italian application Ser. No. (have none), filed June 9, 1914; Patent #143,796, granted Jan. 11, 1915; Belgian application Ser. No. 219,478, filed June 19, 1914; Patent 268,537, granted June 30, 1914; Austrian application Serial No. (have none). filed May 29, 1914; Patent 70004, granted June 21, 1915; German application Ser. No. H.64558, filed Dec. 5, 1913; Patent 290,444, granted Feb. 28, 1916; French application Ser. No. 67157, filed Feb. 23, 1914; Patent 468,821, granted May 4, 1914; Italian application Ser. No. (have none), filed May 20, 1914; Patent 143,193, granted July 11, 1914; Belgian application Ser. No. 219,476, filed Jan. 19, 1914; Patent 268,535, granted June 30, 1914; British application Ser. No. 12,559 of 1914, filed May 21, 1914; Patent 12559 of 1914, granted as of Dec. 5, 1913; Austrian application Ser. No. (have none), filed May 22, 1914; Patent 69358, granted Mar. 27, 1915; German application Ser. No. H.68470, filed May 19, 1915; Patent 295,816, granted Dec. 18, 1916; French application Ser. No. 83050, filed Apr. 21, 1916; Patent 481,561, granted Sept. 25, 1916; British application Ser. No. 6218 of 1916, filed May 1, 1916; Patent 100,483, granted as of May 19, 1915; Belgian application Ser. No. 225,208, filed June 24, 1919; Patent 280937, granted (not yet issued); Italian application Ser. No. (have none) filed May 4, 1916; Patent 154,095, granted June 5, 1916; Austrian application Ser. No. (have none), filed Apr. 29, 1916; Patent 81367, granted Sept. 25, 1920), of which the following is a specification.

My invention relates to the production of permanent effects in cotton fabrics which are effected by chemical structural changes in the fibres.

The object of the invention is to produce a structural change in the cotton fibres that will result in a more valuable fabric such for example as a fabric having a more pleasing appearance or effect, and one that is permanent, i. e., that will withstand repeated laundering, and according to the preferred method, that will give to the fabric a permanent transparent effect.

Mercer in the year 1844 and others later have observed that if concentrated sulphuric acid is allowed to act on cotton, the cotton takes on a parchmentized or parchment-like appearance. According to Mercer, this effect is obtained by sulphuric acid of 49.5° to 55.5° Bé.; and by reason of this action the cellulose will undergo a change rendering it more susceptible to dyes. Blondell (Bulletin Rouen Vol. 10, 1882, pages 438, 471–472) has also observed that sulphuric acid of from 45° to 50° Bé. imparts to the cellulose the capacity of being brightly colored with methyl blue, whereas a parchmentizing or parchment-like effect only results when the sulphuric acid is of a concentration of from 53° to 55° Bé. (Bulletin Rouen Vol. 10, 1882, page 471).

As a matter of fact, I have discovered, and it can be demonstrated, that sulphuric acid of a concentration of 51° Bé. and above produces on the cellulose an entirely different effect than that produced thereon by an acid whose concentration is below 51° Bé., i. e., not substantially over 50½° Bé. Although a more highly concentrated sulphuric acid imparts to cotton fabric after a few seconds' action a typical parchment-like appearance, such an acid of, for example, 50° Bé. even after acting for say fifteen minutes, will not cause a like alteration of the cellulose, and in contradistinction to the effect of a slightly stronger acid, the fabric will not be weakened by even longer action.

I have also discovered that much more distinctive transparent effects, and a fabric of considerable commercial value can be obtained if mercerized cotton fabric, or fabric made of mercerized cotton, is subjected to treatment with sulphuric acid of over 50½° Bé. (not substantially less than 51° Bé.) and then washing out the acid.

By mercerizing the cotton fabric and also treating it with sulphuric acid of above 50½° Bé., I obtain a novel fabric having enhanced transparent effects hitherto unknown. This is to be explained by the fact that the chemical alteration which cotton fibres undergo on being mercerized makes them more adaptable or susceptible to the reaction, in consequence whereof a greater transparency is obtained than is the case with cotton fabric not mercerized.

Cotton fabric thus treated with a mercerizing treatment and with the acid, as above stated, possesses an exceedingly great affinity for many dyes, and upon being dyed color the fabric much darker than would otherwise be the case.

It will be understood by those skilled in the art that the extent to which concentrations of sulphuric acid over and above 50½° Bé. can be practically used, will depend entirely upon the conditions under which the acid treatment is carried out and the length of time that the acid is allowed to act. If the acid is too strong or allowed to act too long, the fabric will be damaged. Satisfactory results have been obtained with sulphuric acid of a concentration of 54° Bé. acting upon the cotton fabric for about five seconds.

It is a curious fact that in the treatment of mercerized cotton fabrics with sulphuric acid, the so-called parchmentized action (but which in reality in the case of my present process produces a true transparent effect) only results when the concentration of the acid is in excess of 50½° Bé.

The previously known action of sulphuric acid of the higher concentrations on the ordinary cotton fabric did produce on the fabric a parchmentizing effect and thereby did render the fabric more nearly transparent than was the ordinary cotton fabric so acted upon, but the resulting fabric was different from the distinctive transparent fabric produced by my process, wherein sulphuric acid of the concentration of over 50½° Bé. is used on the mercerized fabric.

It is a characteristic of fabric treated according to my said processes, that the fibres are chemically structurally changed, and that the chemical structural change is permanent, i. e., will withstand repeated laundering, so that the goods may be laundered without eliminating or materially altering their said characteristics, and this greatly enhances their value.

Having thus described my invention, what I claim as new and desire to secure by Letters Patent, is:

1. Method of treating cotton fabric to produce a fabric in which the fibres have been chemically structurally altered to give to the fabric an all over transparent effect which is permanent, which method comprises subjecting the fabric to two chemical treatments, one a treatment with caustic alkali which will chemically structurally change the fabric, and the other a treatment with concentrated sulphuric acid which will differently chemically structurally change the fibres without seriously impairing the strength or flexibility of the fabric to produce in conjunction with said other treatment said transparent effect, the fabric being subjected to one of said treatments after the other, and after the acid treatment washing the fabric.

2. Method of treating cotton fabric so as to produce fabric in which the fibres have been chemically structurally altered into fibres giving to the fabric a permanent transparent effect, which method comprises subjecting the fabric to two chemical treatments, one a treatment with caustic alkali which will chemically structurally change the fabric, and the other a treatment with concentrated sulfuric acid which will differently chemically structurally change the fabric without seriously impairing the strength or flexibility of the fabric to produce, in conjunction with the other treatment, said transparent effect, the fabric being subjected to one of said treatments after the other.

3. Method of treating cotton fabric to produce a fabric in which the fibres have been chemically structurally altered into fibres giving to the fabric a permanent all over transparent effect, which comprises subjecting the fabric to two chemical treatments, each being such as to chemically structurally change the fibres without destroying their strength and flexibility, one a mercerizing treatment and the other a brief treatment with sulphuric acid of over 50½° Bé., the fabric being subjected to one of said treatments and then to the other, and after the acid treatment washing the fabric.

4. Method of treating cotton fabric to produce a colored fabric in which the fibres have been chemically structurally altered into fibres giving a permanent transparent effect, which comprises subjecting the fabric to two chemical treatments, each being such as to chemically structurally change the fibres without destroying their strength and flexibility, one a mercerizing treatment with caustic soda and stretching, and the other a treatment for a few seconds with concentrated sulphuric acid of over 50½° Bé., the fabric being subjected to one of said treatments after the other, and after the acid treatment washing the fabric, and then dyeing the fabric after both said chemical treatments to obtain a deeper and more permanent color effect.

5. Method of treating cotton fibres to produce a fabric the fibres of which have been chemically structurally altered from ordinary cotton fibres into fibres which give to the fabric a permanent transparent effect, which comprises subjecting the fibres to mercerization treatment, and to sulphuric acid of over 50½° Bé., one treatment after the other, and washing after the acid treatment.

6. Method of treating cotton fibres to produce a fabric the fibres of which have been chemically structurally altered from ordinary cotton fibres into fibres which will give to the fabric a permanent transparent effect, which comprises subjecting the fibres to two chemical treatments, each being such as to chemically structurally change the fibres without destroying their strength or flexibility, one a treatment with caustic alkali, and the other a treatment with concentrated sulfuric acid, the acid treatment being such that in conjunction with the said caustic alkali treatment it will give the transparent effect, the fibers being subjected to one of said treatments and then to the other.

7. Method of treating cotton fabrics so as to produce fabric in which the fibres have been chemically structurally altered into fibres giving to the fabric a permanent transparent effect, which method comprises subjecting the fabric to two chemical treatments, one a treatment with caustic alkali which will chemically structurally change the fabric, and the other a treatment with concentrated sulfuric acid which will differently chemically structurally change the fabric without seriously impairing the strength or flexibility of the fabric to produce, in conjunction with the other treatment, said transparent effect, the fabric being subjected to one of said treatments after the other, and then dyeing the fabric after both said chemical treatments to obtain a deeper and more permanent color effect.

8. Method of treating cotton fabric to produce a fabric in which the fibers have been chemically structurally altered into fibres giving to the fabric a permanent all over transparent effect, which comprises subjecting the fabric to two chemical treatments, each being such as to chemically structurally change the fibres without destroying their strength and flexibility, one a treatment with caustic alkali, and the other a treatment with a cellulose solubilizing reagent comprising sulphuric acid of over 50½° Bé., which reagent will differently chemically structurally change the fibers to produce, in conjunction with said other treatment, said transparent effect, the fabric being subjected to one of said treatments and then to the other, and after the acid treatment washing the fabric.

In testimony whereof I have signed my name to this specification.

GEORGES HEBERLEIN.